US008770104B2

(12) United States Patent
Prati

(10) Patent No.: US 8,770,104 B2
(45) Date of Patent: Jul. 8, 2014

(54) EQUIPMENT FOR CARRYING OUT THE QUALITY CONTROL OF MATERIAL PRINTED ON PAPER OR PLASTIC BANDS

(75) Inventor: Pietro Prati, Marradi (IT)

(73) Assignee: Prati S.r.l., Marraoi (IT)

(*) Notice: Subject to any disclaimer, the term of this patent is extended or adjusted under 35 U.S.C. 154(b) by 13 days.

(21) Appl. No.: 13/505,461

(22) PCT Filed: Dec. 21, 2010

(86) PCT No.: PCT/EP2010/070445

§ 371 (c)(1),
(2), (4) Date: May 2, 2012

(87) PCT Pub. No.: WO2011/076820

PCT Pub. Date: Jun. 30, 2011

(65) Prior Publication Data

US 2012/0250047 A1 Oct. 4, 2012

(30) Foreign Application Priority Data

Dec. 22, 2009 (IT) .............................. CZ2009A0030

(51) Int. Cl.
*G06K 1/00* (2006.01)
*B41J 1/60* (2006.01)

(52) U.S. Cl.
USPC ........................................... 101/111; 358/1.9

(58) Field of Classification Search
USPC ..................... 358/1.9, 505; 101/105, 111, 122
See application file for complete search history.

(56) References Cited

U.S. PATENT DOCUMENTS 8,531,743 B2 * 9/2013 Wu et al. ....................... 358/502

* cited by examiner

*Primary Examiner* — Barbara Reinier
(74) *Attorney, Agent, or Firm* — Mark M. Friedman

(57) ABSTRACT

The machine of the present invention carries out the operations for the quality control of the material printed on a paper or plastic band; the machine has, in the central part, the quality control equipment, preceded by a first part which is constituted of a spool un-winder and of a final part which is constituted of a spool re-winder. The first part, constituted of the un-winder, is comprised between the unwound material and a main drawer, the central part, which constitutes the quality control equipment, is comprised between the main drawer, the control level and an arrest compensator, secondary operations and re-winding.

8 Claims, 3 Drawing Sheets

EQUIPMENT FOR CARRYING OUT THE QUALITY CONTROL OF MATERIAL PRINTED ON PAPER OR PLASTIC BANDS

TECHNICAL FIELD OF THE INVENTION

The present invention concerns an equipment (machine) for carrying out the quality control on printed material in paper or plastic bands (self-adhesive labels placed on silicone-covered bands), verifying the correspondence of the same with a previously acquired master image, highlighting all the discordances (errors) detected and permitting, after correction, the system to verify that the same is valid.

STATE OF THE ART

Quality control of printed material in paper or plastic bands is carried out by the use of a machine composed of an un-winder to turn the spool of paper or plastic band of the material to be controlled, keeping it correctly taut, a motorized sled to move the material under control at an adjustable speed, a video inspection system that verifies the quality and a spool re-winder to collect and wind the controlled material. In these machines there is also other equipment with functions that are not directly connected to the video inspection.

It must be noted that any machine, which moves a material wound as a spool, from the moment that it receives the command to stop until it reaches complete arrest takes a certain time to do so, and that is proportionate to the velocity and to the deceleration curve of the electro-magnetic equipment; this time is automatically transformed into space (the distance between the point of control and the arrest point).

On the market at present there are various methods and functional logics to create this type of control:

A) Mono-directional control through video inspection:

In this first equipment, the material that is to be inspected by the system moves in a single direction, and in the case of detection of one or more errors the machine slows and positions the errors in a specific zone for the manual correction of the same, without the possibility of checking again whether the correction carried out is valid or not, see FIG. 1. The patent request US2009088889 illustrates such a form of creation.

B) Bi-directional control through video inspection:

In this second equipment, the material to be inspected beneath the video inspection system can be moved in both directions by various methods.

Said system is illustrated in FIG. 2; in this case when the system detects one or more errors it makes the movement of the material stop, therefore making both the spool re-winder and the un-winder turn in the opposite direction and automatically positions the error in a precisely determined point prior to the position of control in such a way that on re-starting the correction carried out is checked, and repeats all this for each single error it detects. This system poses many limits and creates problems in the working interposed between the point of un-winding and the point of control and between the point of control and the re-winding, for example in punch-cutting, numbering, cutting, counting, etc.

In FIG. 3 a third equipment is illustrated, in which a mobile material accumulator is inserted after the control position, in such a way that when the system detects an error it imposes the arrest of the movement of the material, therefore making the un-winder turn in the opposite direction and contemporarily unloading the feeder it automatically positions the error in a position preceding the control without moving the material that is already out of the feeder. This system permits one to carry out the control on the receded material once again and therefore also on the correction just carried out, eliminating the limits imposed by the working interposed between the control and spool re-winding, but does not eliminate those between the un-winding and control.

In FIG. 4 a fourth equipment is illustrated, in which an oscillating accumulator is inserted beneath the position of control (that is unloading prior to the control and loading following control) in such a way that when the system detects an error it imposes the arrest of the movement, keeping both the un-winding and the re-winding still, successively it makes the material move backwards by the mobile carriage, transferring the error positioned by the loader successive to the control of the loader prior to the control. This system does not create problems either for the working prior to the control nor to that successive, but necessitates a quantity of material accumulated in the loader. Furthermore, it does not create lateral slipping of the bands during the phase of discarding of the material.

This system carries out a single correction at a time, also in the case of more errors present contemporarily in the loader.

SUMMARY OF THE INVENTION

To overcome the difficulties present in the state of the art an equipment is created in order to carry out the control of the quality of material printed on paper or plastic bands, comprising a first part for un-winding the band, a central part for the control and correction of errors and a final part for re-winding the band, characterised by the fact that the central part for the control and correction of errors has a device for acquiring images on the band, which is equipped with a moving system which moves it along said band, a band storage, a control device on which master images are loaded, where said control device is provided with a programme which confronts the images obtained by the device for acquiring images on the band with the master images previously loaded on said control device and which, if it encounters differences between the master images and the images acquired from the band, indicates one or more errors, stops the main driving motor and moves the device for acquiring images on the band after the error or the errors noted, in such a way that after the correction of the error or errors said device for acquiring images on the band passes again over the corrected area and checks whether the correction corresponds with the master image previously installed.

Another characteristic is given by the fact that the system of movement of the device for acquiring images from the band comprises a motorized carriage.

Another characteristic is given by the fact that the system of movement of the device for acquiring images from the band comprises a motorized slide.

Another characteristic is given by the fact that the stop time of the main driving motor is pre-determined.

Another characteristic is given by the fact that the stop space is pre-determined.

Another characteristic is given by the fact that the band storage comprises a sliding motorized roller on axial guides.

Other characteristics and advantages of the invention will appear clear from the description, here following, of a method of construction, given as a non-limiting example by the illustrations.

SYNTHETIC DESCRIPTION OF THE ILLUSTRATIONS

DETAILED DESCRIPTION OF A METHOD OF CONSTRUCTING THE INVENTION

Figure 5:
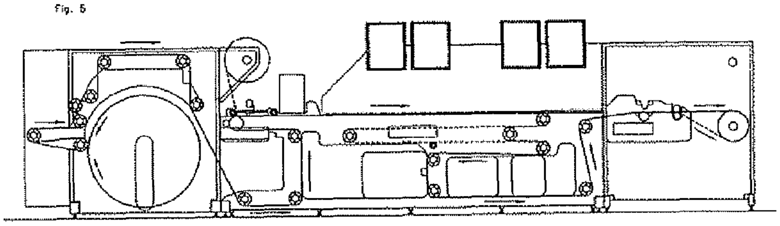
FIG. 5 represents a section of the quality control equipment subject of the present invention.

With reference to FIG. 5, the machine subject of the present invention carries out the operations for the quality control of the material printed on a paper or plastic band; said machine has, in the central part, the quality control equipment, preceded by a first part which is constituted of a spool un-winder and of a final part which is constituted of a spool re-winder. The first part, constituted of the un-winder, is comprised between the unwound material and the main drawer, the central part, which constitutes the quality control equipment, is comprised between the main drawer, the control level and an arrest compensator, secondary operations and re-winding.

The machine subject of the present invention moves the material in a single direction of movement, contrary to the methods seen in the state of the art.

Figure 6:
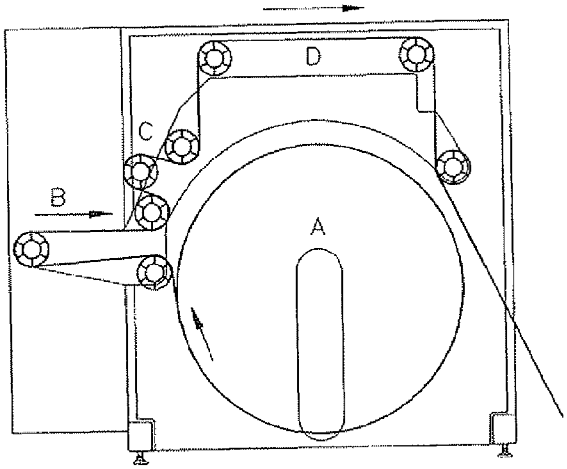
FIG. 6 represents a section of the first part of the spool un-winder of the quality control equipment, subject of the present invention.

Due to the observation of one or more errors, therefore, in the phase of arrest the movement of the material (band) is managed in three diverse phases:

The first part, constituted of the spool un-winder, is represented in FIG. 6 and comprises A) a spindle un-winder, B) a band-linking level, C) a shaking device, D) a band guide. The shaking device C) situated after the spindle un-winder A) provides to control the correct tension of the band and to recover the eventual excess material in the band due to the deceleration curve, making the spindle un-winder A) turn in a contrary direction until the correct tension has been regained.

Figure 7:
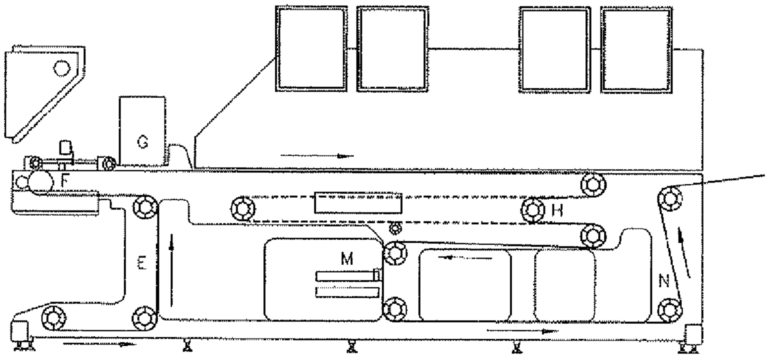
FIG. 7 represents a section of the central controlling part of the quality control equipment, subject of the present invention, with the device for acquiring the images in the initial position.

The central part, which constitutes the equipment for carrying out the quality control is shown in FIG. 7 and comprises: a band guide E), main drawer F), a mobile device for the acquisition of images G), for example a mobile tele-camera, a band accumulator furnished with a mobile compensator roller H), ink-jet printing heads M), an exit aligner N). When the mobile device for acquiring images G), mounted on a sled or on a motorized carriage detects an error, the main drawing motor F) is immediately arrested, or rather in a determined time, in such a way that during the arrest time the moving band travels a determined distance and the point of arrest of the error is found within a distance of less than a predetermined measure, in particular not greater than 150 cms from the point of control (position X), to avoid problems both to the material and for the successive working, the mobile compensator roller H) provides to feed the third part of re-winding with a quantity of material previously accumulated in such a way that the arrest of the same occurs gradually.

The equipment is furnished with a command device on which master images are installed, furnished with a programme which confronts the images acquired in the control phase with the master images previously installed on said device, and if it encounters differences between said images it detects one or more errors and therefore provides to arrest the main drawing motor and to move the device for acquiring the images after the error or the errors noted in such a way that after the correction of the error or the errors it passes again over the corrected area and checks whether the correction carried out on the band corresponds with the master image previously installed.

Figure 8:
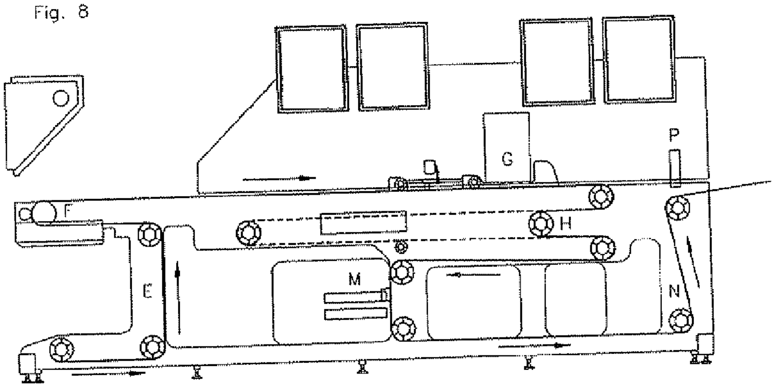
FIG. 8 represents a section of the central controlling part of the quality control equipment, subject of the present invention, with the device for acquiring the images in the position assumed after having detected one or more errors.

To carry out the correction of the error, therefore, and the successive control, it is not necessary to make the material (band) move backwards, on the contrary, it is, rather, the entire control system, that is the device for acquiring the images G), which runs axially above the material passing over the point where the error has been detected, see FIG. 8. This permits the operator to carry out the correction to the same and contemporarily to others too, if present on the plane of work and therefore, by making the control system constituted of the mobile device for the acquisition of the images G) return to the starting point, has the opportunity, passing over the corrected error or errors, to verify whether the correction carried out results as correct or not.

In case the correction should not result as conforming, the control system repeats the above-described movement until said correction results as conforming, all without moving the band.

Figure 9:
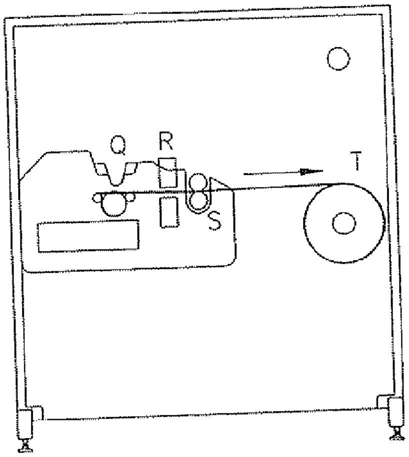
FIG. 9 represents a section of the final spool re-winding part of the quality control equipment, subject of the present invention.

The final part, which constitutes the spool re-winder shown in FIG. 9, comprises: Q) the cutting group with interchangeable blade and counter-blade or razor, R) suction cleaner for stray dust, S) differential drawing group, T) pneumatic spindle re-winder. In this part of the machine the operations of longitudinal cutting, cleaning and re-winding are carried out; the movement of the material in this area must be carried out in such a way that the start and the arrest occur gradually.

Advantages of the Invention

Figure 1:
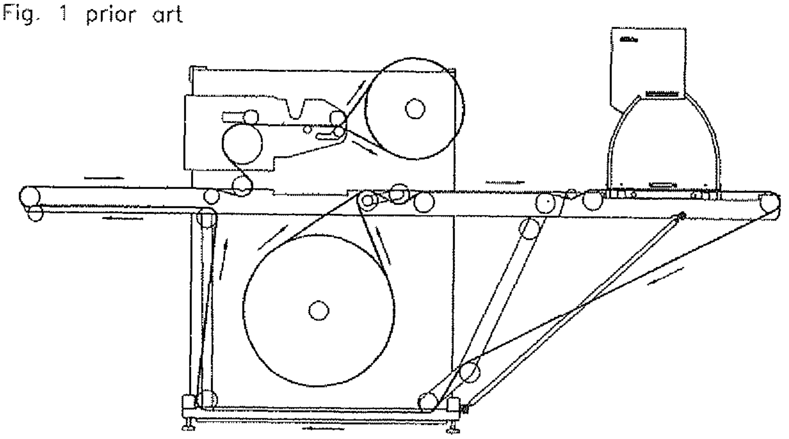
Fig. 1 prior art
FIG. 1 represents a section of a first, state of the art quality control equipment.
Figure 2:
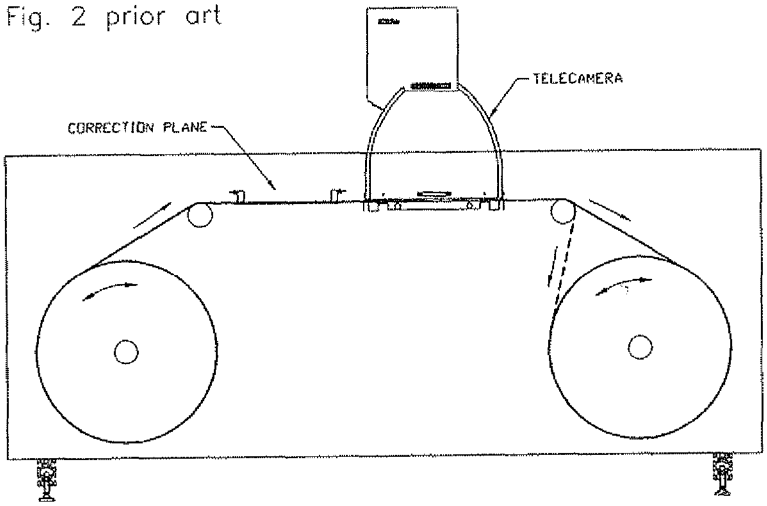
Fig. 2 prior art
FIG. 2 represents a second state of the art quality control equipment.
Figure 3:
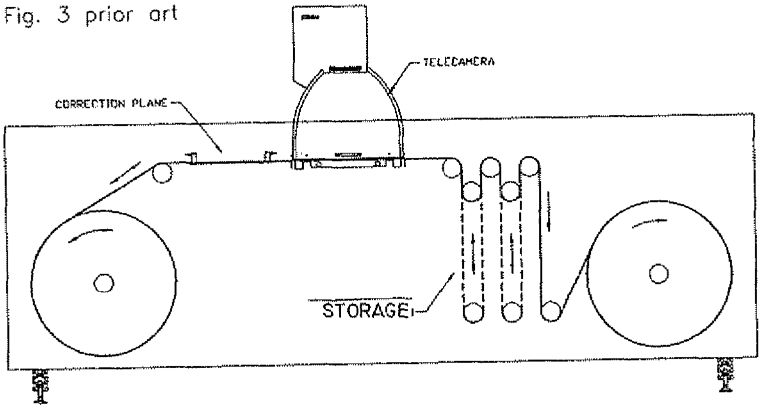
Fig. 3 prior art
FIG. 3 represents a section of a third state of the art quality control equipment.
Figure 4:
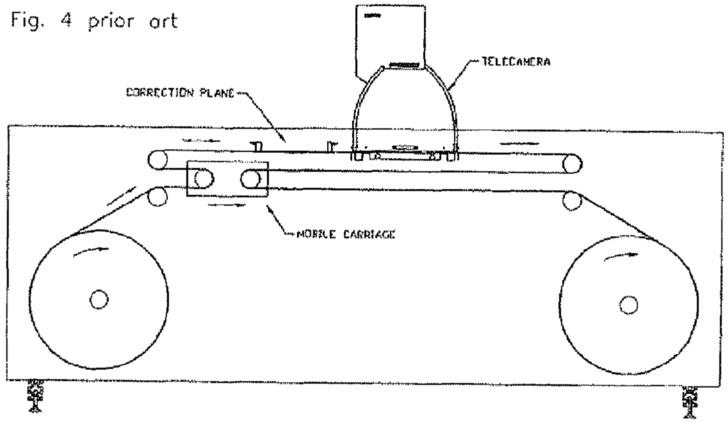
Fig. 4 prior art
FIG. 4 represents a fourth state of the art quality control equipment.

The principle aim of the present invention is that of eliminating the technical problems due to the movement of the band in the two directions (principally the loss of alignment of the band, damage to the material being worked, etc.), see FIGS. 2-3, and to reduce the operative times of the existing systems.

In any phase of the working, the band of material is moved in advance in a single direction; with the equipment subject of the present invention a mono-directional movement of the band is obtained.

The arrest of the movement of the band occurs in a harsh manner only in the central part, the area in which the control device, which may be tele-camera or other device for acquiring images, is located.

In the central area the material under control after the arrest does not undergo any movement contrary to the original direction of movement.

The device for acquiring images to control is mounted on a moving system, for example a motorized carriage, which permits the movement of the same along the band of material already controlled, within a well-defined space.

In the central area the device for acquiring images for control (tele-camera), after having detected the error and having imposed the arrest of the band, automatically runs in an axial direction along the band of material already controlled, positioning itself at a pre-determined distance prior to the point where the error was noted.

The axial movement of the device for acquiring images for control frees the defective part of the band, permitting the operator to carry out the required correction.

In the case of two or more defects positioned in the area of correction, they are indicated contemporarily in such a way that all the corrections can be carried out in a single operative phase.

Following correction the device for acquiring images, after having re-activated the control device, re-positions itself at the base point, running in a contrary direction to the advancement of the band.

In an area successive to the control a motorized roller with the function of a compensator, which runs on axial guides, is positioned, to permit the central or control part of the equipment and the third part of the equipment to arrest the advancement of the band at velocities that are different between them without creating slacking or extra tensions to the band in this phase of the working.

In the re-starting phase the compensator roller, contemporarily with the advancement of the band, through an electronic system of control of tension on the band, and through interpolation between the velocity of the main drawer and the velocity of the secondary drawer positioned in the third part of the machine, provides to accumulate a quantity of material proportional to the velocity reached. This mechanism permits the automatic accumulation of the quantity of material sufficient to manage both the start and the arrest of the third part of the machine correctly.

In the case of a number of errors close between them, they can be corrected contemporarily.

It permits special materials to be worked, without damaging the same.

The discovery, it must be noted, is not limited to the representations given in the illustrations, but may be perfected and modified by those skilled in the art without, however, departing from the specifics of the patent.

The present invention permits numerous advantages and to overcome difficulties that could not have been overcome with the systems in commerce at present.

The invention claimed is:

1. Equipment for carrying out the quality control of material printed on a paper or plastic band, comprising a first part for un-winding the band, a central part for the control and correction of errors and a final part for re-winding the band, wherein the central part for the control and correction of errors has a device for acquiring images on the band, which is equipped with a moving system which moves it along said band, a band storage, a control device on which master images are loaded, where said control device is provided with a programme which confronts the images obtained by the device for acquiring images on the band with the master images previously loaded on said control device and which, if it encounters differences between the master images and the images acquired from the band, indicates one or more errors, stops a main driving motor and moves the device for acquiring images on the band after the error or the errors noted, in such a way that after the correction of the error or errors said device for acquiring images on the band passes again over the corrected area and checks whether the correction corresponds with the master image previously installed.

2. The equipment according to claim 1 wherein the system of movement of the device for acquiring images from said band comprises a motorized carriage.

3. The equipment according to claim 1 wherein the system of movement of the device for acquiring images from said band comprises a motorized slide.

4. The equipment according to claim 2 wherein a stop time of said main driving motor is pre-determined.

5. The equipment according to claim 2 wherein a stop space of the band is predetermined.

6. The equipment according to claim 1 wherein said band storage comprises a sliding motorized roller on axial guides.

7. The equipment according to claim 3 wherein a stop time of the main driving motor is pre-determined.

8. The equipment according to claim 3 wherein a stop space of the band is predetermined.

* * * * *